UNITED STATES PATENT OFFICE 2,454,862

PRODUCT AND PROCESS OF REACTING ALKENYL SUCCINIC ESTERS WITH SULFUR

George T. Collins, Philadelphia, Pa., assignor to Allied Chemical & Dye Corporation, New York, N. Y., a corporation of New York No Drawing. Application April 13, 1944, Serial No. 530,937

8 Claims. (Cl. 260—75)

This invention relates to compositions of matter and to a process of producing the same.

It is an object of the invention to provide a process for production of novel chemical compounds useful for various purposes in the industrial arts, particularly as plasticizers and extenders in resins, natural and synthetic rubbers, as rubber substitutes for certain purposes, and as ingredients of coating compositions such as paints, varnishes and enamels. The invention comprehends the compounds as well as the process of making them.

The compounds to which the invention relates are the reaction products of sulfur with esters of alkenyl-substituted succinic acids. The alkenyl-substituted succinic acid esters may be prepared by reacting mono-olefins, e. g. mono-olefinic cracked petroleum distillate fractions, with maleic anhydride at an elevated temperature sufficiently high to promote the reaction, preferably above 200° C., under sufficient pressure to maintain the mono-olefins in the liquid phase, and then esterifying the resultant alkenyl succinic acid anhydrides with an alcohol. Where monohydric alcohols are employed, the resultant esters may be represented by the following formula:

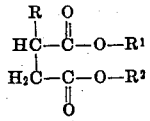

in which R is an alkenyl group containing a single double bond and preferably from 3 to 14 carbon atoms and $R^1$ and $R^2$ are the same or different hydrocarbon radicals, for example, alkyl, cycloalkyl, or aralkyl radicals, corresponding to the hydrocarbon radical of the alcohol employed in effecting esterification. Where dihydroxy compounds are utilized for esterifying the anhydrides, the esters are of the chain type as illustrated by the following formula for the ethylene glycol ester:

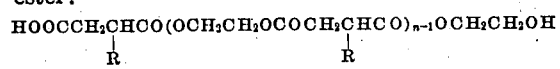

in which $n$ is the number of anhydride and glycol molecules which combine to form the ester molecule and R is an alkenyl group containing from 3 to 14 carbon atoms. Where polyhydroxy compounds containing more than two hydroxyl groups, e. g. glycerol, are employed, the hydroxyl groups may react with more than two anhydride molecules, thus giving rise to more complex compounds in which the residues of the hydroxy compound and anhydride molecules are linked together in a manner analogous to the linking of glycerol and phthalic anhydride residues in alkyd resins. The anhydrides may be hydrated before esterification and the esters formed by reaction of the acids with the desired alcohol.

The monohydric alcohol esters may be prepared by reacting the anhydrides with a desired hydroxy compound at temperatures of from 95° to 195° C. until esterification proceeds to the desired extent. Completion of the esterification is indicated by cessation of evolution of water from the reaction mixture. Where polyhydroxy compounds such as ethylene glycol and glycerol are employed, the reactants may be heated at a temperature below that at which the hydroxy compound is driven off, e. g. 150° to 190° C., until monoesterification is substantially complete and the temperature then raised above 190° C., e. g. to from 195° to 300° C., until esterification proceeds to the desired extent, e. g. substantial completion as indicated by cessation of evolution of water. Further heating of the esters effects partial polymerization of the esters by reaction between the double bonds of alkenyl groups of a plurality of ester molecules. The expression "esters" is used herein to include such partially polymerized as well as unpolymerized esters.

Esterification of anhydrides formed by reacting a mixture of mono-olefins such as cracked petroleum distillate with maleic anhydride, produces a mixture of alkenyl succinic acid esters, the average number of carbon atoms in the alkenyl groups of the esters depending on the boiling range of the distillate fraction employed. By utilizing fractions of narrow boiling range, ester mixtures whose alkenyl groups do not vary greatly in size from the average group of the mixture may be obtained. Substantially pure mono-olefins such as amylene, hexene or nonene may be reacted with maleic anhydride if it is desired to form a substantially pure ester, but it is usually more economical to utilize cracked petroleum distillate containing a mixture of mono-olefins as the mono-olefinic hydrocarbons.

The compounds employed for esterifying the alkenyl-substituted succinic acids or their anhydrides include monohydroxy and polyhydroxy alcohols. Examples of such compounds are: methanol, ethanol, the propanols, butanols, allyl alcohol, cyclohexanol, methylcyclohexanols, benzyl alcohol, the methyl benzyl alcohols, ethylene glycol, polyethylene glycols such as diethylene glycol, and polyhydric alcohols containing more than two hydroxyl groups such as glycerol. Where polyhydroxy compounds such as glycerol are employed, they may be partially esterified by reaction with a monocarboxylic acid prior to reaction with the alkenyl succinic acid or anhydride, e. g. glycerol may be reacted with an equimolar proportion of monocarboxylic acid and the resultant monoglyceride containing two hydroxyl groups per molecule reacted with alkenyl succinic acid anhydride. Preferably at least a sufficient amount of the hydroxy compounds is used to effect substantially complete esterification of the acids or anhydrides.

The resultant alkenyl succinic acid esters react with sulfur to produce reaction products differing widely in character from the esters. By utilizing different amounts of sulfur and different esters, reaction products varying from viscous fluids to resinous and rubber-like compositions are obtainable; the amount of sulfur may vary from 0.1% to 20% based on the weight of the ester. Reaction of lower amounts of sulfur within this range with the monohydric and dihydric alcohol esters of anhydrides tends to produce viscous fluid reaction products of lower volatility than the corresponding esters; increasing the amount of sulfur raises the consistency of the reaction product so that more viscous or solid reaction products are obtained.

The preferred products are made by reacting polymeric esters formed by esterifying alkenyl-substituted succinic acid anhydrides containing from 3 to 14 carbon atoms in the alkenyl group with a polyhydric compound, particularly polyhydric alcohols containing two or three hydroxyl groups such as glycol and glycerol, with from 0.1% to 20% of sulfur based on the weight of the esters.

The reaction between the sulfur and the esters may be carried out in a simple manner by heating the reactants together at a temperature sufficiently high to cause the reaction to take place, preferably between 100° and 200° C. Ordinarily it is desirable to stir or agitate the reaction mixture in order to promote homogeneous dispersion of the sulfur in the ester during the reaction so as to obtain homogeneous reaction products. While the nature of the reaction is not fully understood, the sulfur appears to react with the double bonds of the alkenyl groups of the esters.

The following examples are further illustrative of the invention:

*Example 1.*—192 parts by weight of a mixture of alkenyl-substituted succinic acid anhydrides containing an average of about 6.1 carbon atoms in the alkenyl groups were heated with 62 parts by weight of ethylene glycol at from 150° to 160° C. for one hour while stirring and the temperature of the mixture was gradually raised to 200° C. during the next 6 hours. The acid number of the resultant ester was 7. The ester was then mixed with 5% of sulfur based on the weight of the ester and heated for 12 hours at 100° C. The sulfur reacted with the ester and a resilient resinous reaction product was obtained.

*Example 2.*—117 parts by weight of a mixture of alkenly-substituted succinic acid anhydrides containing an average of about 6.1 carbon atoms in the alkenyl groups were heated with 38.7 parts by weight of glycerol at about 128° C. for 2 hours while stirring the mixture and the temperature of the mixture was then raised to about 175° C. during the course of the next 2 hours and maintained at this point for 2 additional hours. The resultant ester was a hard product which shattered when subjected to a sharp blow. 20 parts by weight of this product were reacted with 2 parts by weight of sulfur at a temperature of 140° C. for 16 hours. The reaction product was rubber-like while hot and became hard and brittle when cool.

Since certain changes may be made without departing from the scope of the invention, it is intended the above shall be interpreted as illustrative and not in a limiting sense.

I claim:

1. A composition of matter comprising the reaction product of an alcohol ester of an alkenyl-substituted succinic acid containing at least 3 carbon atoms in the alkenyl substituent with elemental sulfur, in which product from 0.1% to 20% of sulfur based on the weight of the ester is combined with said ester.

2. A composition of matter comprising a reaction product formed by reaction at temperatures from 100° C. to 200° C. of an alchol ester of an alkenyl-substituted succinic acid, containing from 3 to 14 carbon atoms in the alkenyl substituent, with from 0.1% to 20% of elemental sulfur based on the weight of the ester.

3. A composition as defined in claim 2 in which said alcohol ester is an ethylene glycol polymeric ester.

4. A composition as defined in claim 2 in which said alcohol ester is a glycerol polymeric ester.

5. A process which comprises heating an alcohol ester of an alykenyl-substituted succinic acid containing at least 3 carbon atoms in the alkenyl substituent with from 0.1% to 20% of elemental sulfur based on the weight of the ester to a temperature at which reaction takes place between said ester and sulfur.

6. A process which comprises heating at a temperature between about 100° and about 200° C. an alcohol ester of an alkenyl-substituted succinic acid containing from 3 to 14 carbon atoms in the alkenyl substituent with from 0.1% to 20% of elemental sulfur based on the weight of the ester at least until reaction takes place between said ester and sulfur.

7. A process as defined in claim 6 in which the alcohol ester is an ethylene glycol polymeric ester.

8. A process as defined in claim 6 in which the alcohol ester is a glycerol polymeric ester.

GEORGE T. COLLINS.

REFERENCES CITED

The following references are of record in the file of this patent:

UNITED STATES PATENTS

| Number | Name | Date |
| --- | --- | --- |
| 1,082,106 | Arsem | Dec. 23, 1913 |
| 2,195,362 | Ellis | Mar. 26, 1940 |
| 2,230,005 | Moser | Jan. 28, 1941 |
| 2,373,015 | Cowan et al. | Apr. 3, 1945 |

FOREIGN PATENTS

| Number | Country | Date |
| --- | --- | --- |
| 464,276 | Great Britain | Apr. 12, 1937 |
| 526,802 | Germany | June 10, 1931 |
| 537,865 | Germany | Nov. 7, 1931 |
| 676,659 | France | Nov. 29, 1929 |